US007719788B2

(12) United States Patent
Tomita

(10) Patent No.: US 7,719,788 B2
(45) Date of Patent: May 18, 2010

(54) SERVO INFORMATION CORRECTING METHOD

(75) Inventor: Isamu Tomita, Kawasaki (JP)

(73) Assignee: Toshiba Storage Device Corporation, Tokyo (JP)

( * ) Notice: Subject to any disclaimer, the term of this patent is extended or adjusted under 35 U.S.C. 154(b) by 0 days.

(21) Appl. No.: 12/360,627

(22) Filed: Jan. 27, 2009

(65) Prior Publication Data

US 2009/0290253 A1    Nov. 26, 2009

(30) Foreign Application Priority Data

May 20, 2008    (JP)    ............... 2008-132027

(51) Int. Cl.
*G11B 5/596* (2006.01)
(52) U.S. Cl. .................................. 360/77.07
(58) Field of Classification Search .............. 360/77.07, 360/75, 77.04, 77.08, 78.04, 78.14, 48, 67; 714/92; 369/47.15
See application file for complete search history.

(56) References Cited

U.S. PATENT DOCUMENTS

| 6,516,443 | B1* | 2/2003 | Zook ........................... 714/792 |
| 7,286,319 | B2* | 10/2007 | Kida et al. ................ 360/78.14 |
| 7,304,922 | B2* | 12/2007 | Furukawa et al. ......... 369/47.15 |
| 7,324,300 | B2* | 1/2008 | Hara ........................ 360/78.04 |
| 7,365,927 | B2* | 4/2008 | Takamatsu et al. ............ 360/48 |
| 7,453,664 | B2* | 11/2008 | Kawabe ................... 360/77.08 |
| 7,630,155 | B2* | 12/2009 | Maruyama et al. ............ 360/48 |
| 2009/0268332 | A1* | 10/2009 | Yamazaki ..................... 360/67 |

FOREIGN PATENT DOCUMENTS

| JP | A 60-117461 | 6/1985 |
| JP | A 3-263662 | 11/1991 |
| JP | A 10-74371 | 3/1998 |
| JP | A 2007-95168 | 4/2007 |

\* cited by examiner

*Primary Examiner*—Fred Tzeng
(74) *Attorney, Agent, or Firm*—Greer, Burns & Crain, Ltd.

(57) ABSTRACT

A operation of storing a post code, which is read from each servo frame on a target track of a disk recording medium, in a memory if an on-track condition for determining that a head is controlled to be positioned on the target track is satisfied is executed. Next, a operation of using the post code, which is stored in the memory, for a correction of a demodulation position if the post code corresponding to each servo frame is stored in the memory and the on-track condition is satisfied in the correction of the demodulation position in each servo frame is executed.

8 Claims, 13 Drawing Sheets

| SF 0 | SF 1 | SF 2 | SF 3 | SF 4 | | SF 101 | SF 102 | SF 103 | SF 104 | SF 105 | SF 106 | SF 107 |
|---|---|---|---|---|---|---|---|---|---|---|---|---|
| 5 | 12 | -3 | 2 | -10 | | 21 | -128 | 13 | 6 | -3 | -1 | -9 |

FIG. 9A

| SF 0 | SF 1 | SF 2 | SF 3 | SF 4 | | SF 101 | SF 102 | SF 103 | SF 104 | SF 105 | SF 106 | SF 107 |
|---|---|---|---|---|---|---|---|---|---|---|---|---|
| -128 | -128 | -128 | -128 | -128 | | -128 | -128 | -128 | -128 | -128 | -128 | -128 |

FIG. 9B

| SF 0 | SF 1 | SF 2 | SF 3 | SF 4 | | SF 101 | SF 102 | SF 103 | SF 104 | SF 105 | SF 106 | SF 107 |
|---|---|---|---|---|---|---|---|---|---|---|---|---|
| -128 | -128 | -128 | -128 | -128 | | -128 | -128 | 13 | 6 | -3 | -1 | -9 |

FIG. 9C

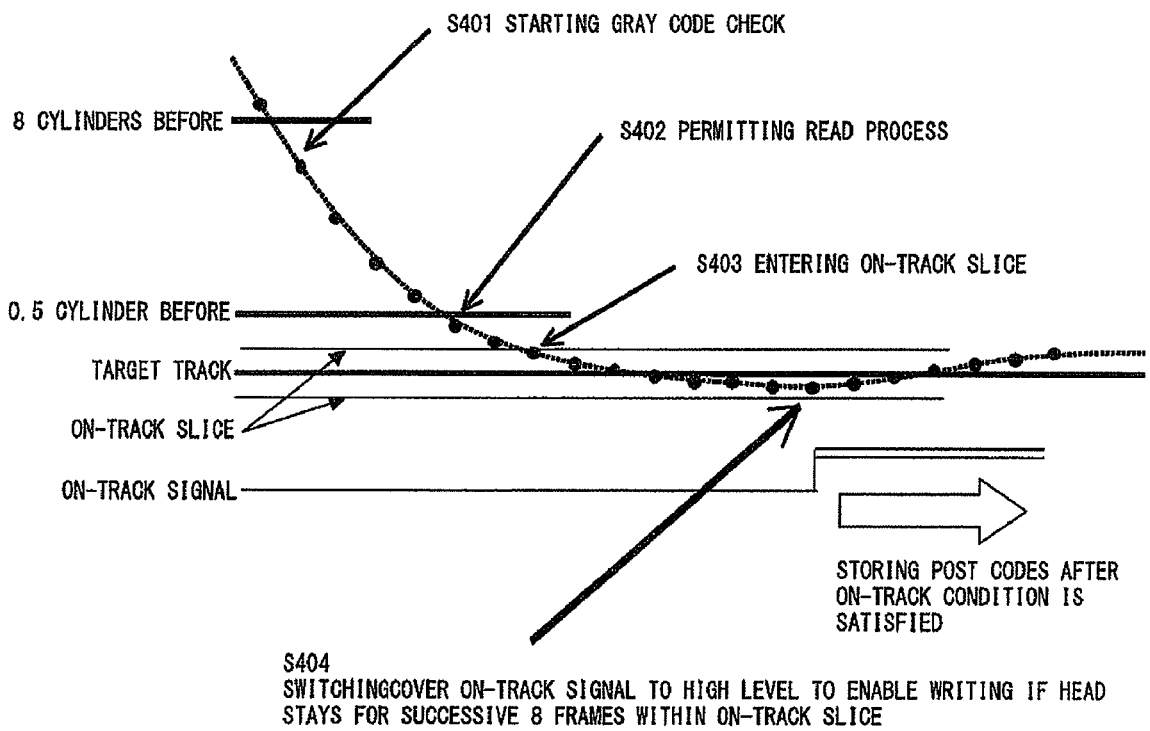
F I G. 10

SERVO INFORMATION CORRECTING METHOD

CROSS-REFERENCE TO RELATED APPLICATIONS

This application is based upon and claims the benefit of priority of the prior Japanese Patent Application No. 2008-132027, filed on May 20, 2008, the entire contents of which are incorporated herein by reference.

FIELD

The embodiment discussed herein is related to a technique for positioning a head on the basis of servo information written to a servo frame of a disk recording medium.

BACKGROUND

For disk devices such as a magnetic disk device and an optical disk device, which read/write data from/to a rotating recording disk with a head, the accurate positioning of the head on a target track is important for a higher recording density.

In the meantime, since the recording disk rotates, its position accuracy is deteriorated by a periodic disturbance such as eccentricity, etc. or other non-periodic disturbances. To implement a track pitch with high density, the position accuracy must be improved.

A head is positioned on a data track with a servo control in accordance with servo information recorded to a disk recording medium. Accordingly, the quality of the servo information, which is base information, exerts a significant influence on the positioning accuracy of a drive operation.

Specifically, for example, if a magnetic head is positioned on a target track of a magnetic disk in a hard disk device using a magnetic recording method, the magnetic head is moved toward the target track by controlling a voice coil motor in accordance with a difference between the current track position, which is determined based on the servo information that the magnetic head detects from the disk recording medium, and the target track position. When the magnetic head is determined to be moved to the target track position (enters an on-track state), the magnetic head is positioned at the center of the target track with a position signal obtained from the servo information. Then, data is written or read via the magnetic head.

Here, there is no information indicating a track position in a write of the servo information to the magnetic disk. Accordingly, the servo information is written, for example, by measuring the position of the magnetic head with laser ranging equipment, etc., and by positioning the magnetic head at a predetermined position on the magnetic disk. In this case, the phenomenon that the recording position of the servo information to be written deviates from an ideal center position of the track toward the radius direction of the magnetic disk due to influences of rotational fluctuations or vibrations of a spindle motor for rotating the magnetic disk, or the eccentricity of the magnetic disk, etc. occurs. This causes the phenomenon called RRO (Repeatable Run Out) that the actual center position of the track, which is detected at a read/write from/to the magnetic disk, fluctuates periodically, leading to a data read/write error, etc. caused by the overlapping of adjacent tracks.

For example, the technique using a post code recited in the following Patent Document 1 or 2 is known as the conventional technique for improving the RRO.

This conventional technique is described. Initially, a magnetic disk 701 includes a plurality of concentric tracks 702, each of which is partitioned, for example, into 108 regions 703 called a sector in the circumferential direction. Each sector 703 is partitioned into a region called a servo frame 704, and a data region 705 to which actual user data is recorded.

Each servo frame 704 is composed of a preamble 706, a servo mark 707, a gray code 708, four burst signals A, B, C and D 709, and a post code 710. The state of an actually recorded signal is represented as FIG. 2.

When the magnetic head is positioned on the target track of the magnetic disk, the servo frame 704 is detected by detecting the signal pattern of the preamble 706 while the magnetic head scans on the magnetic disk 701, subsequently the track number is obtained by detecting the gray code 708 after the servo mark 707 is detected, and the current track position is identified.

The voice coil motor is then controlled according to a difference between the current track position and the target track position, and a servo control for moving the magnetic head toward the target track is performed. Finally, the magnetic head is determined to have reached the target track position, namely, to have entered the on-track state at the time when the state where the current track position and the target track position match continues for a predetermined number of servo frames (such as eight frames).

Thereafter, the magnetic head detects the burst signals A to D 709 within the servo frame 704, whereby the magnetic head is positioned at the center of the track.

Here, in an inspection process after the magnetic disk 701 is mounted in the hard disk device, the magnetic disk 701 is rotated, its amount of eccentricity (=RRO) is measured for each sector 703, and the amount of correction for the eccentricity is written to the servo frame 704 (FIG. 1) of each sector as a post code 710.

When a read/write of the hard disk device is actually made, the current position including the eccentricity is calculated by reading and demodulating the burst signals 709 and the post code 710 from each servo frame 704 after the magnetic head 701 enters the on-track state, and by correcting the current position, which is obtained from the burst signals 709, with the amount of correction for the eccentricity of the post code 710, and the servo control of the head position that cancels the eccentricity is performed.

As schematically illustrated as FIG. 3, the recording positions of servo information 902 (=burst signals 709, etc.) to be written deviate from an ideal center position 901 toward the radius direction of the magnetic disk, which is indicated by 905, due to influences such as rotational fluctuations or vibrations of the spindle motor for rotating the magnetic disk, the eccentricity of the magnetic disk, or the like.

When such servo information 902 are read by the read head 904, the actual track center position, which is identified based on the servo information 902, includes an RRO component that fluctuates finely, for example, as represented by 1001 of FIG. 4A, leading to a read/write error.

In the meantime, since the value for correcting the eccentricity of the servo information 902 illustrated as FIG. 3 is recorded to the post code 903 illustrated as FIG. 3, a preferable position value 1003 with small fluctuations can be obtained by adding a post code value 102 to the position value 1001 before being corrected as represented as FIG. 4A.

FIG. 5A represents the enlarged view of this state. The position value 1001 with large fluctuations before being corrected as represented by 1101 is modified to the corrected control position value 1003 with small fluctuations as represented by 1102.

In the above described servo control using the post code, if the post code value 1002 to be corrected becomes an abnormal value as represented by 1104 due to some cause (for example, if the most significant bit is inverted) for the position value 1001 before being corrected, which is represented by 1103, the control position value 1003 after being corrected, which is modified with the abnormal value, also results in an abnormal value as represented by 1105, and can possibly cause an off track.

FIG. 4B is an example of actual waveforms. A large spike noise is superposed on the position value 1003 corrected with the post code value 1002, and an off track is caused since an abnormality occurs in the post code value 1002 as represented by 1004.

As the factor to cause an off track, for example, the lack of an offset margin of the read head 1203 due to an offset of the write position of the post code 1201 from the track center 1202 as illustrated as FIG. 6A is considered.

For example, also the lack of a read margin of the read head 1203 when a small defect exists adjacently to the post code 1201 as illustrated as FIG. 6B is considered.

In either case, a write cannot be made if the position of the magnetic head deviates from the target track due to an abnormal read of the post code value. Alternatively, the magnetic head is erroneously determined to be positioned at the center of the track although it is actually positioned at the border of the track with an abnormal post code value, and if a write is made in such a state, the write can be possibly made to an adjacent track, leading to a write off track.

The idea to add a parity bit to a post code and to correct the position with the post code if the result of the parity check is correct can be adopted. This method, however, includes the problems that the amount of information is increased by adding the parity bit, and a heavier load is imposed on the processing of the parity check.

[Patent Document 1] Japanese Laid-open Patent Publication No. 03-263662

[Patent Document 2] Japanese Patent Laid-open Publication No. 60-117461

SUMMARY

According to an aspect of the embodiment, a methods includes a servo controlling method, which is used in a disk storage device, for controlling a head to be positioned on a target track by reading servo information and a post code, which indicates an eccentricity of the servo information, from each servo frame recorded on each track of a disk recording medium via the head provided in an actuator, by correcting a demodulation position demodulated from the servo information with the post code, and by driving the actuator on the basis of the corrected demodulation position, including: storing the post code, which is read from each servo frame on the target track of the disk recording medium, in a memory if an on-track condition for determining that the head is controlled to be positioned on the target track is satisfied; and using the post code stored in the memory in order for a correction of the demodulation position if the post code corresponding to each servo frame is stored in the memory and the on-track condition is satisfied, in the correction of the demodulation position in each servo frame.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 9A is a schematic diagram illustrating a configuration of memory regions for post codes in the embodiment;

FIG. 9B is a schematic diagram illustrating a configuration of memory regions for post codes in the embodiment;

FIG. 9C is a schematic diagram illustrating a configuration of memory regions for post codes in the embodiment;

FIG. 10 is a schematic diagram for explaining a state where a magnetic head reaches a target track and an on-track condition is satisfied;

DESCRIPTION OF EMBODIMENTS

A preferred embodiment for carrying out the present invention is described in detail below with reference to the drawings.

The Embodiment

The embodiment described below is characterized in avoiding a write off track caused by a post code by storing the post code, which is determined to be properly read out, for each servo frame of each track and by using the post code continuously, since an erroneous post code read deteriorates a positioning accuracy and causes an unrestorable write off track.

Figure 3:
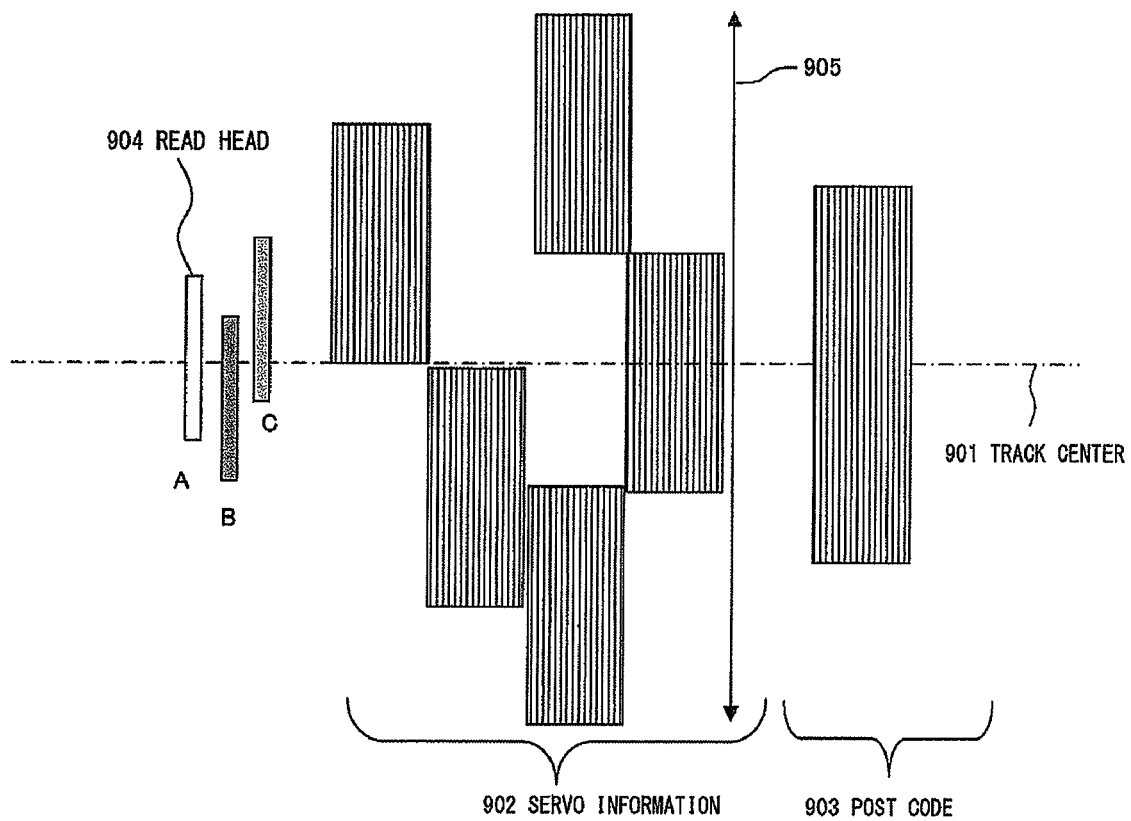
FIG. 3 is a schematic diagram illustrating fluctuations of recording of servo information.
Figure 4A:
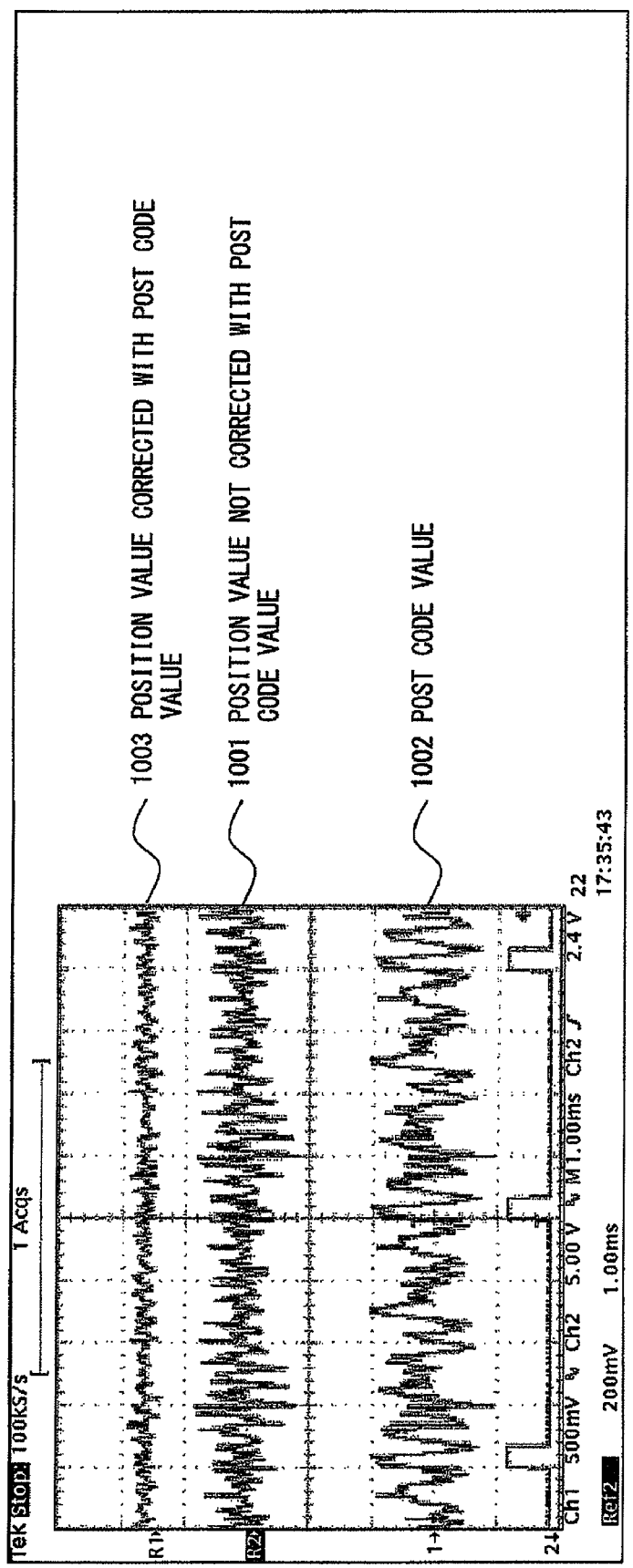
FIG. 4A is a waveform chart representing a relationship between a position value and a post code value.
Figure 4B:
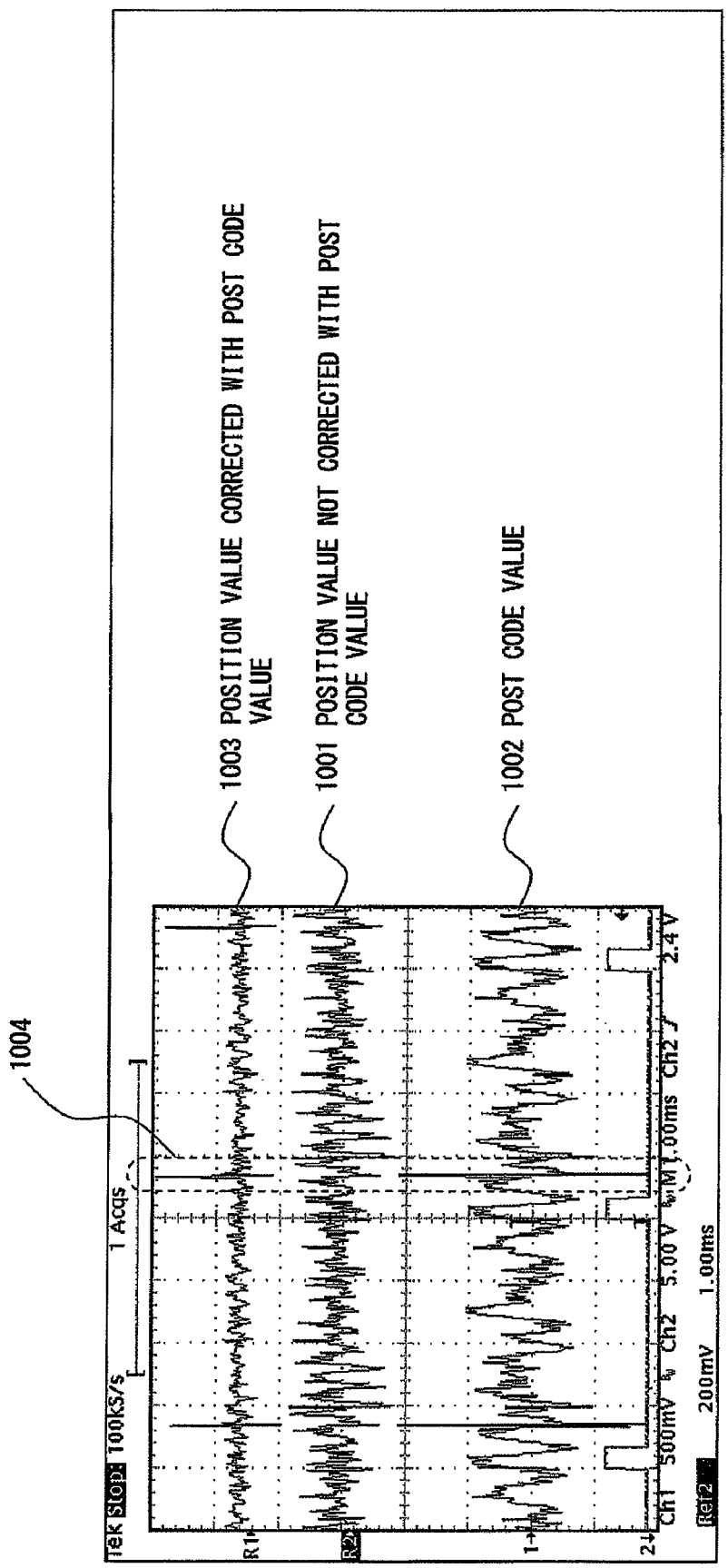
FIG. 4B is a waveform chart representing a relationship between a position value and a post code value.
Figure 5A:
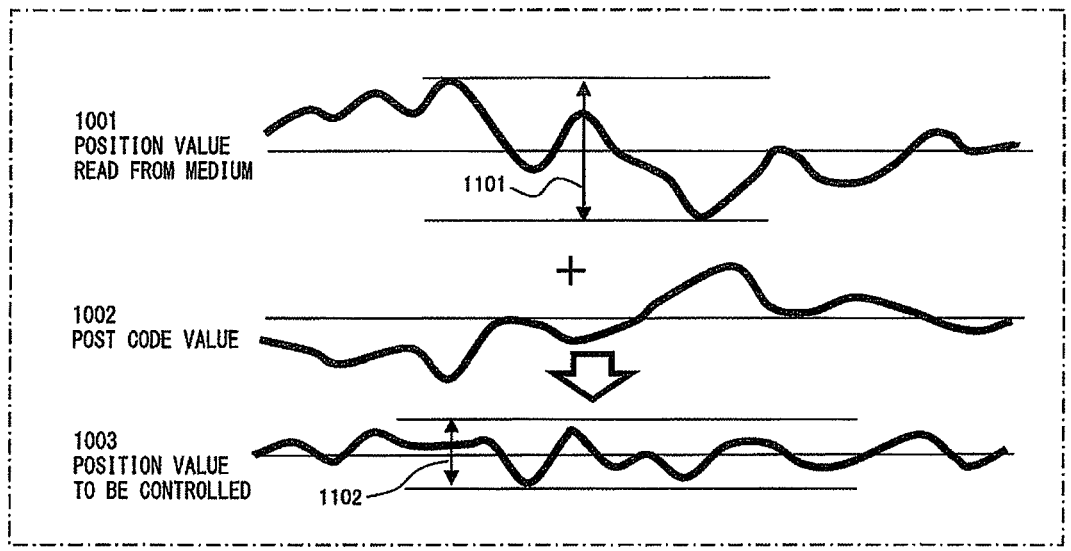
FIG. 5A is a schematic diagram for explaining operations of a conventional technique and its problem.
Figure 5B:
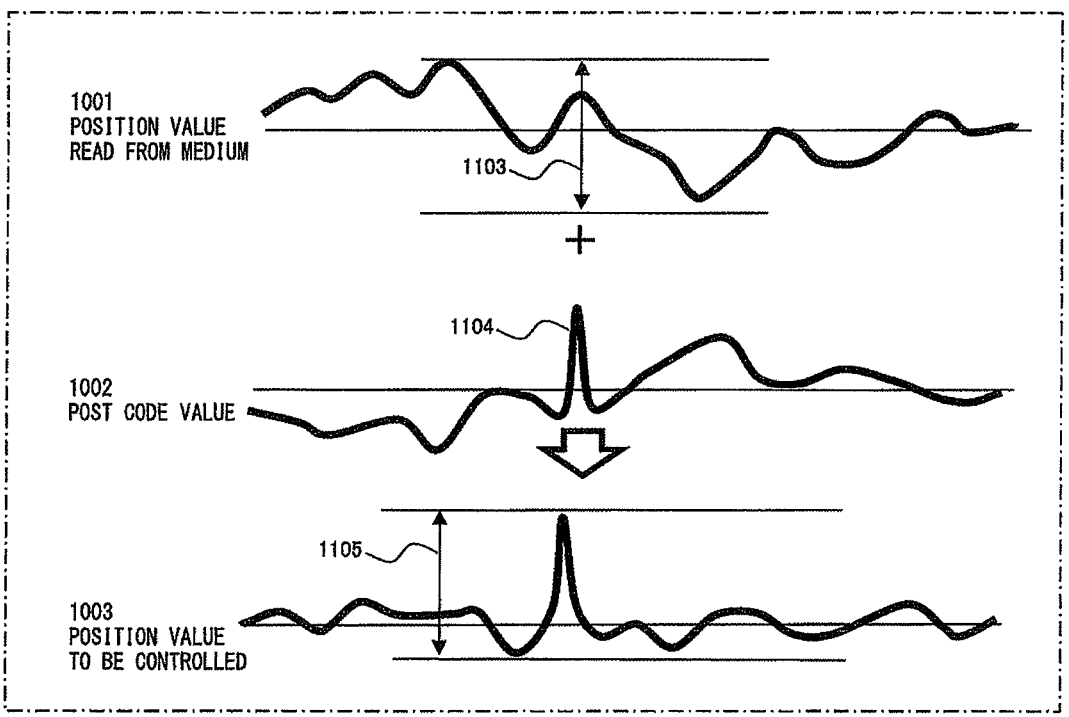
FIG. 5B is a schematic diagram for explaining operations of a conventional technique and its problem.
Figure 6A:
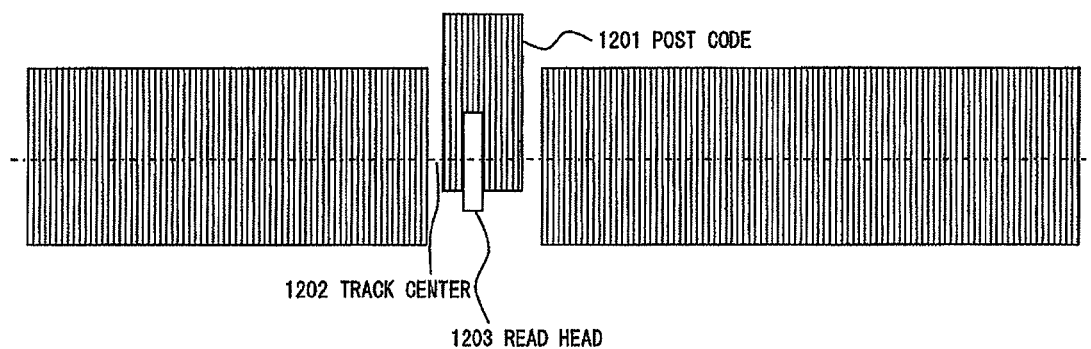
FIG. 6A is a schematic diagram for explaining a cause of an abnormal post code value.
Figure 6B:
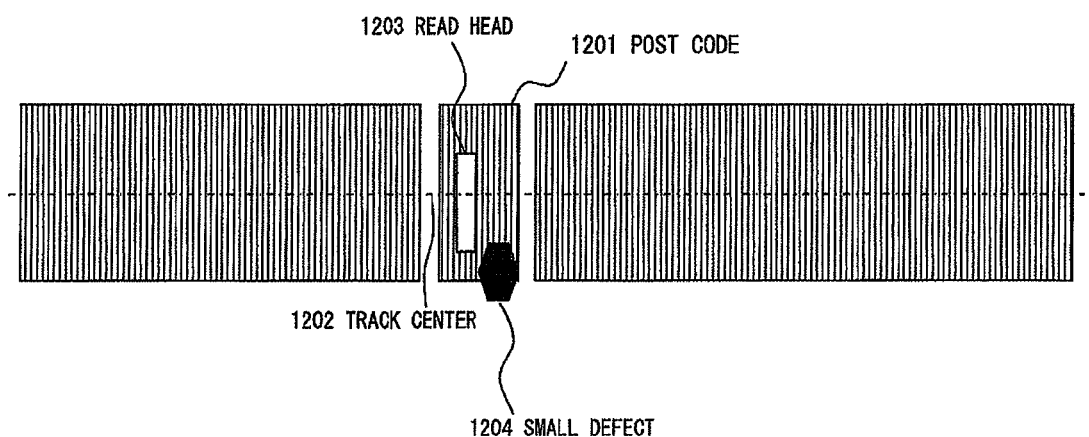
FIG. 6B is a schematic diagram for explaining a cause of an abnormal post code value.

In the above described FIG. 3, the values of the servo information 902 written to a medium (magnetic disk) vary by the path (A, B, C, or the like in FIG. 3) of the read head 904. However, the post code 903 does not vary in the vicinity of the track center 901. Accordingly, if a proper post code can be once read from the medium, it is no longer necessary to read a post code from the medium, and the previously read post code can be continuously used.

With this characteristic, if a proper post code is determined to be read out as a result of determining whether or not the post code once read from the medium is proper, a correction value obtained according to the post code is stored, and the stored post code is used for operations performed on the same track, which include a subsequent retry.

According to this embodiment, whether or not a post code read from a medium is proper can be determined without adding a parity bit, etc. to the post code, and an unrestorable write off-track error can be avoided.

Additionally, means for preventing a retry out caused by an erroneously stored post code is also provided.

Configuration of the Embodiment

Figure 7:
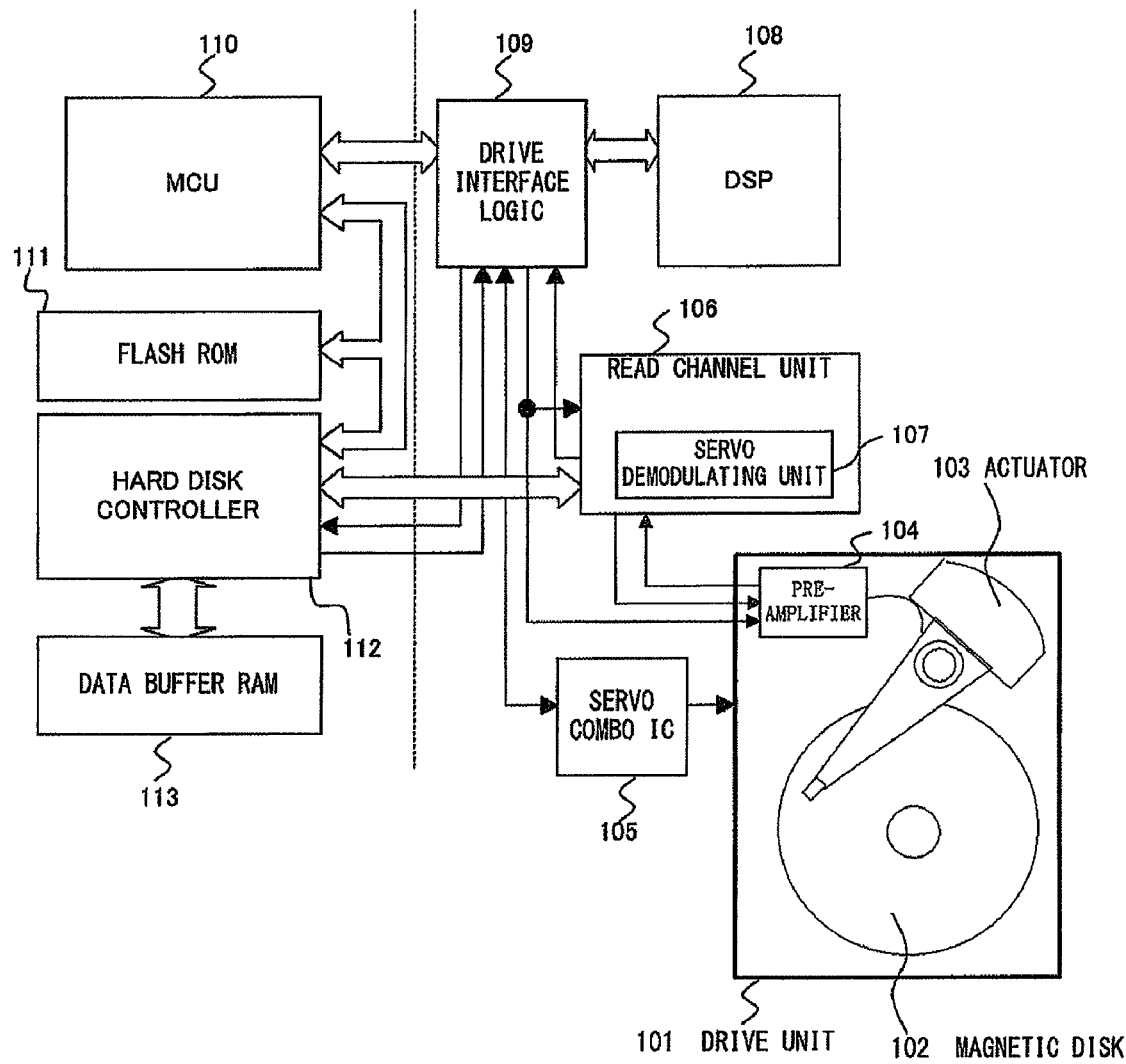
FIG. 7 is a block diagram illustrating a configuration of a hard disk device in an embodiment.

FIG. 7 is a block diagram illustrating a configuration of a hard disk device in the embodiment according to the present invention.

A drive unit 101 is composed of a magnetic disk 102 rotated by a spindle motor not illustrated, an actuator 103 in which a read/write head and a voice coil motor not illustrated are incorporated, a preamplifier 104 for amplifying a current applied to the read/write head, and the like.

A servo combo IC 105 performs a control for positioning the head on a target track by controlling the voice coil motor, etc. within the actuator 103 on the basis of a servo current set by a DSP (Digital Signal Processor) 108 via a drive interface logic 109.

A read channel unit 106 converts user read/write data into a current value, and provides the data to the read/write head within the actuator 103 via the preamplifier 104. A servo demodulating unit 107 within the read channel unit 106 reads and demodulates servo information (a preamble, a servo mark, a gray code, and burst signals A to D) and a post code, which are read from the magnetic disk 102 via the read head within the actuator 103 and the preamplifier 104.

The DSP 108 performs operations such as a servo operation for positioning the head on a target track on the basis of the servo information and the post code, which are input from the servo demodulating unit 107 via the drive interface logic 109. The servo current value determined as a result of the servo operation is set in the servo combo IC 105 via the drive interface logic 109 as described above.

An MCU (Micro Control Unit) 110 controls various types of operations of the entire hard disk device on the basis of a control program stored in a flash ROM 111.

A hard disk controller 112 transmits/receives user read/write data, an execution command, etc. to/from a main storage device (not illustrated) of a computer to which the hard disk device is connected. The hard disk controller 112 causes the user write data collectively transferred from the external main storage device, etc. to be temporarily stored in a data buffer RAM 113, transmits the user write data to the read channel unit 106, and causes the user write data to be written to the magnetic disk 102 via the preamplifier 104 and the actuator 103. Moreover, the hard disk controller 112 causes the user data, which is read from the magnetic disk 102 via the actuator 103, the preamplifier 104 and the read channel unit 106, to be temporarily stored in the data buffer RAM 113, and collectively transfers the user data to the external main storage device, etc.

Basic Operations of the Embodiment

Figure 8:
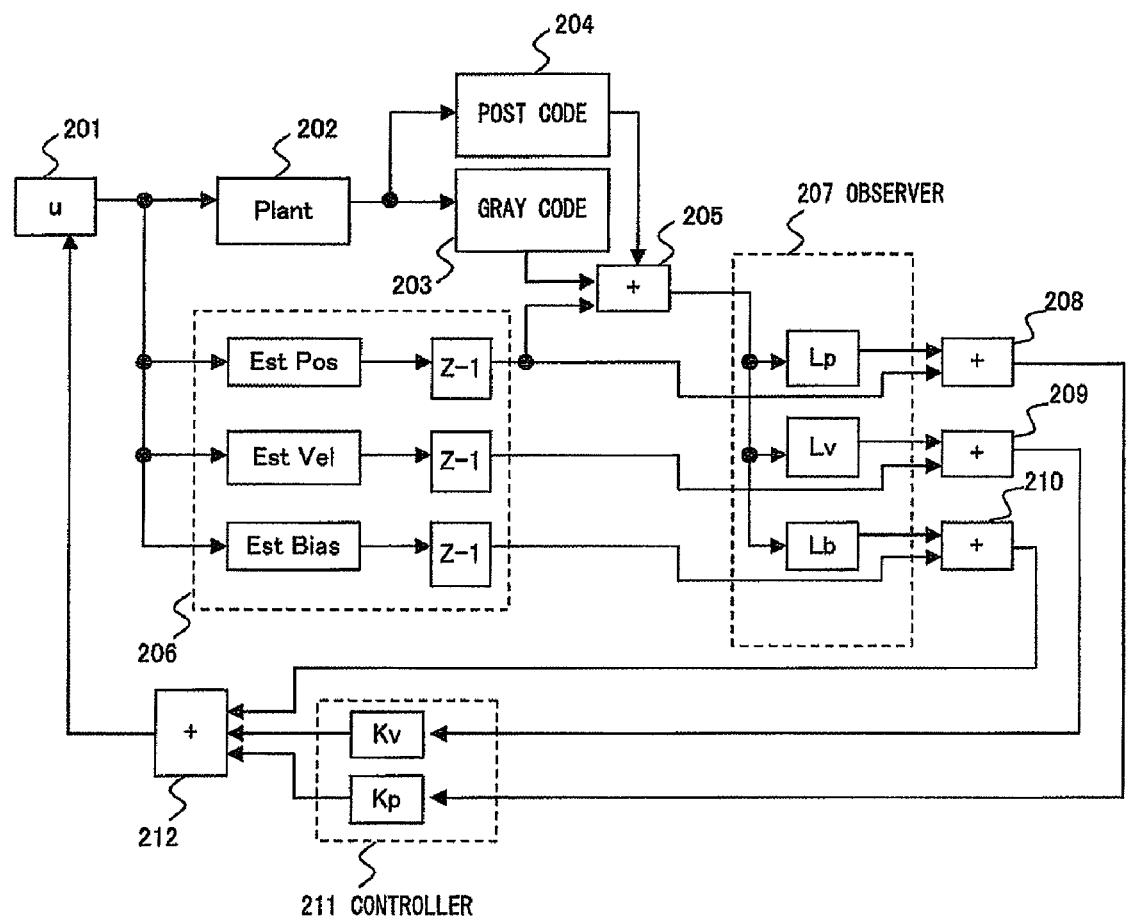
FIG. 8 is a block diagram sowing a servo control performed in the preferred embodiment.

FIG. 8 is a block diagram illustrating the servo control for positioning the head on a target track, which is implemented as firmware by the DSP 108 illustrated as FIG. 7.

A servo control target 201 is a current value u provided to the voice coil motor within the actuator 103 via the servo combo IC 105 illustrated as FIG. 7.

Plant 202 corresponds to the portion composed of the actuator 103, the preamplifier 104, the servo demodulating unit 107, etc., and outputs therefrom are a gray code 203 and a post code 204, which are obtained as servo information.

The post code 204 is added to the gray code 203 at 205, and a result of the addition is input to an observer 207. The observer 207 outputs control values such as a position Lp, a velocity Lv, and a torque bias Lb by using the result of the addition as an input.

The output values of the observer 207 are respectively added by adders 208, 209 and 210 to a position estimated value EstPos, a velocity estimated value EstVel, and a torque bias estimated value EstBias, which are Z-transform outputs from an estimator 206 using the control current value u as an input, converted into current values by a controller 211 and an adder 212, and fed back as the current value u.

This embodiment specifically relates to the control technique for improving the accuracy of the post code 204 in each servo frame on a target track when the magnetic head is positioned on the target track in the above described control system.

Post Code Control in the Embodiment

In this embodiment, the DSP 108 illustrated as FIG. 7 performs post code control operations described below.

The DSP 108 stores the post code of only a servo frame, which satisfies the on-track condition, in an internal memory corresponding to each servo frame after a seek operation is terminated and the magnetic head reaches a target track, or destroys the post code stored in the memory in the case of off track.

In this way, a post code expected to be proper can be stored without adding a parity bit to the post code, etc. for determining its appropriateness.

If the on-track condition happens to be satisfied by a combination of a post code and the position of the magnetic head when the post code includes an abnormal value, the state where the on-track condition is not satisfied at a subsequent retry can possibly continue. To avoid this, the DSP 108 destroys the post code of the corresponding servo frame unless the on-track condition is satisfied, and again reads a post code from the medium (magnetic disk 102) at the next rotation.

In this way, even if the error rate of a post code is high, an unrestorable write off track can be avoided to enable a data write. Also at the time of a read operation, a read error caused by continuously using an erroneous post code can be avoided.

FIG. 9A, 9B is a schematic diagram illustrating a configuration of memory regions for post codes within the DSP 108 in order to implement the above described operations.

In a state example represented as FIG. 9A, −128 is assigned as a value indicating "not stored". This example assumes that the number of servo frames (hereinafter abbreviated to SFs) per track is 108.

In the state example represented as FIG. 9A, an SF 102 (representing the 102nd servo frame) is a servo frame whose post code is not stored, post codes stored in the memory are used for servo frames except for the SF 102, and a post code read from the medium (magnetic disk 102) is used for a control in the SF 102.

If the gray code and the post code, which are read from the medium and added, satisfy the on-track condition in the SF 102, the values read at that time are written to the memory region of the SF 102.

As represented as FIG. 9B, all post codes in the servo frames stored in the memory are overwritten with the value of −128 that indicates "not stored" when a seek instruction for another track is started.

FIG. 10 is a schematic diagram for explaining the state where the magnetic head reaches a target track and the on-track condition is satisfied.

Figure 1:
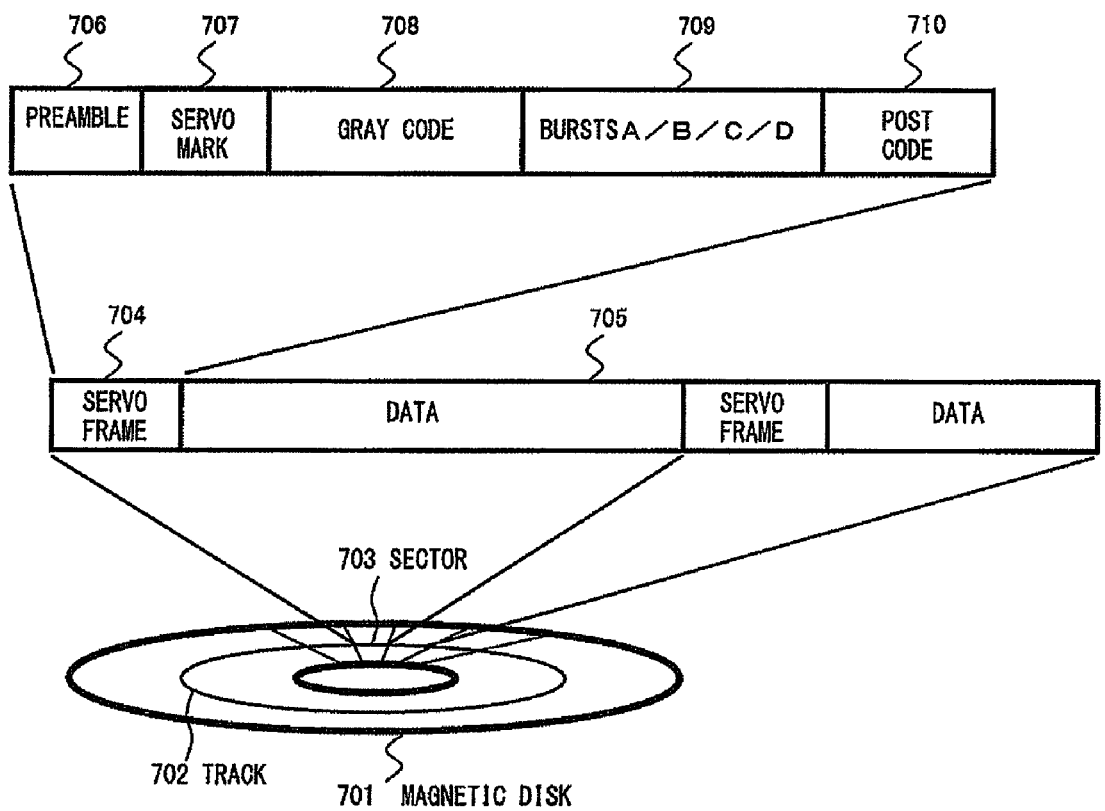
FIG. 1 is a schematic diagram for explaining a servo frame.
Figure 2:
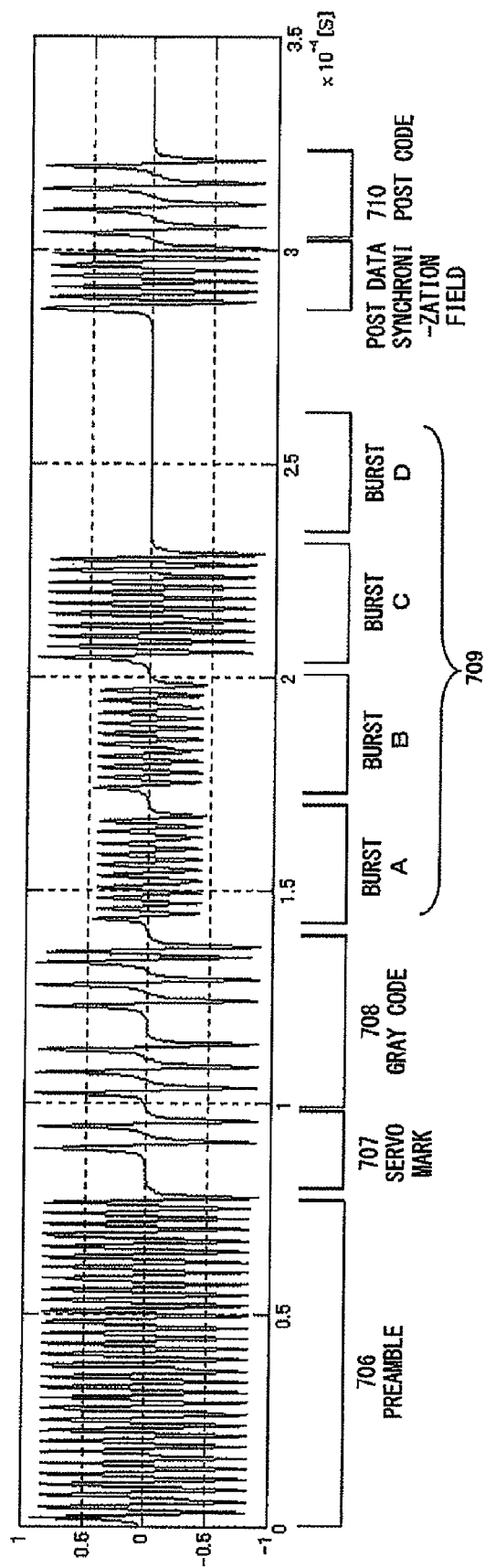
FIG. 2 is a waveform chart of recording signal in a servo frame.

The DSP 108 starts to check the gray code (708 of FIG. 1 or 2) when the current track number reaches 8 cylinders before the target track (S401 of FIG. 10).

The DSP 108 permits the read channel unit 106 (FIG. 7) to execute a read process at the time when the track number identified based on the gray code read from each servo frame reaches 0.5 cylinder before the target track (S402 of FIG. 10).

The DSP 108 drives an internal on-track signal to a high level at the time (S404 of FIG. 10) when the head position stays within an on-track slice set for the target track for consecutive 8 frames from the time (S403 of FIG. 10) when the track number identified based on the gray code read from each servo frame matches the target track and the head position identified based on the burst signals A to D (709 of FIG. 1 or 2) read from each servo frame enters the on-track slice, and permits the read channel unit 106 (FIG. 7) to perform a write operation. The DSP 108 stores the post code read from each servo frame in a storage region corresponding to each servo frame within the internal memory while the head is positioned on the target track at and after this timing.

The example of FIG. 9C represents the state where the on-track condition is satisfied, a seek operation is terminated (corresponding to the timing of S404 represented as FIG. 10) and post codes are stored in the memory in the servo frames in and after the SF 103.

Figure 11:
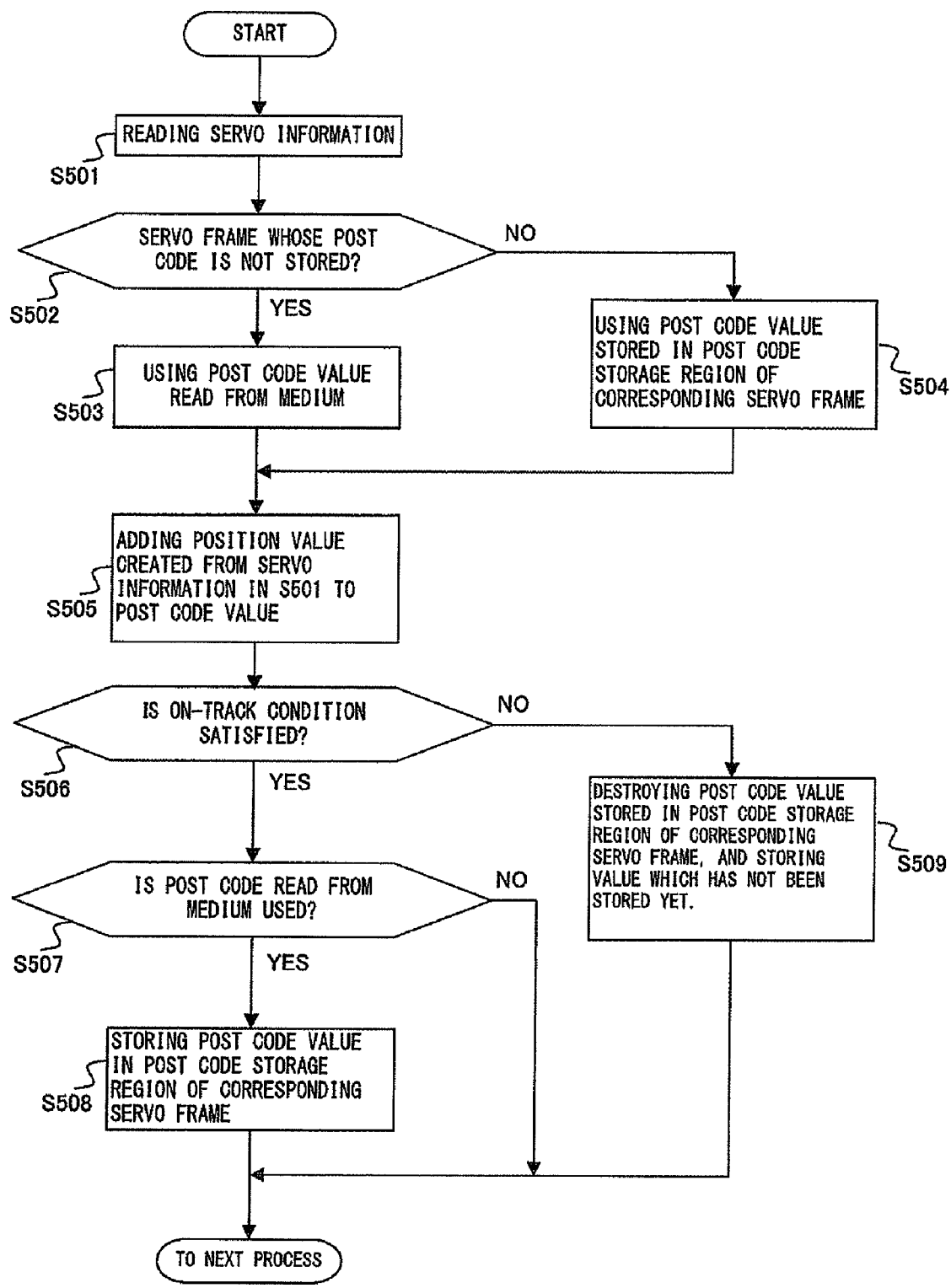
FIG. 11 is a flowchart illustrating post code control operations after the on-track condition ends and a seek operation is terminated.

FIG. 11 is a flowchart illustrating post code control operations performed by the DSP 108 after the on-track condition ends and the seek operation is terminated.

Initially, the DSP 108 reads servo information (burst signals A to D) via the servo demodulating unit 107 (FIG. 7) (step S501).

Next, the DSP 108 references the memory regions of post codes, and determines whether or not the current servo frame is a frame whose post code is not stored in the memory (step S502). This determination is implemented as an operation for determining whether or not the value of the corresponding memory region is −128.

If the DSP 108 determines that the current servo frame is a frame whose post code is not stored in the memory, it performs the servo control by using the post code value of the current servo frame, which is read from the medium (magnetic disk 102) via the servo demodulating unit 107 (FIG. 7), as a value of 204 of FIG. 8 (steps S502 to S503).

In the meantime, if the DSP 108 determines that the current servo frame is the frame whose post code is stored in the memory, it performs the servo control by using the post code value, which is stored in the storage region corresponding to the current servo frame within the internal memory, as a value of 204 of FIG. 8 (steps S502 to S504).

Next, the DSP 108 adds a position value created from the servo information read in step S501 to the post code value determined in the above described step S503 or S504 (step S505).

Then, the DSP 108 determines whether or not the on-track condition is satisfied, namely, whether or not the position value obtained as a result of the addition enters the on-track slice of the target track illustrated as FIG. 11 (step S506).

The DSP 108 further determines by executing step S503 whether or not the post code value read from the medium was used, if it determines that the on-track condition is satisfied (steps S506 to S507).

The DSP 108 stores the post code value, which is read from the medium in step S503, in the storage region of the corresponding servo frame in the internal post code memory if the determination made in step S507 is "YES", and terminates the control for the post code corresponding to the current servo frame. Then, the flow proceeds to the next process.

If the determination made in step S507 is "NO", the DSP 108 maintains the value stored in the storage region of the corresponding servo frame in the internal post code memory, and terminates the control for the post code corresponding to the current servo frame. The flow then proceeds to the next process.

If the DSP 108 determines that the on-track condition is not satisfied in step S506, it destroys the post code value stored in the storage region of the corresponding servo frame in the internal post code memory by writing −128 to the storage region (steps S506 to S509).

Figure 12A:
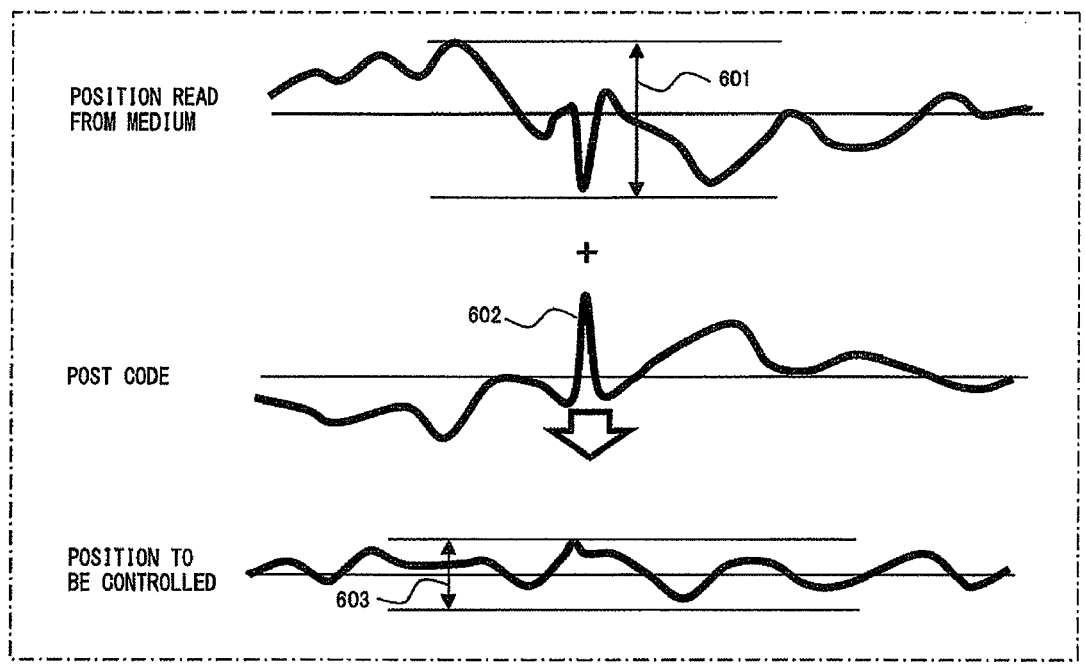
FIG. 12A is a schematic diagram for explaining the operations of the embodiment.
Figure 12B:
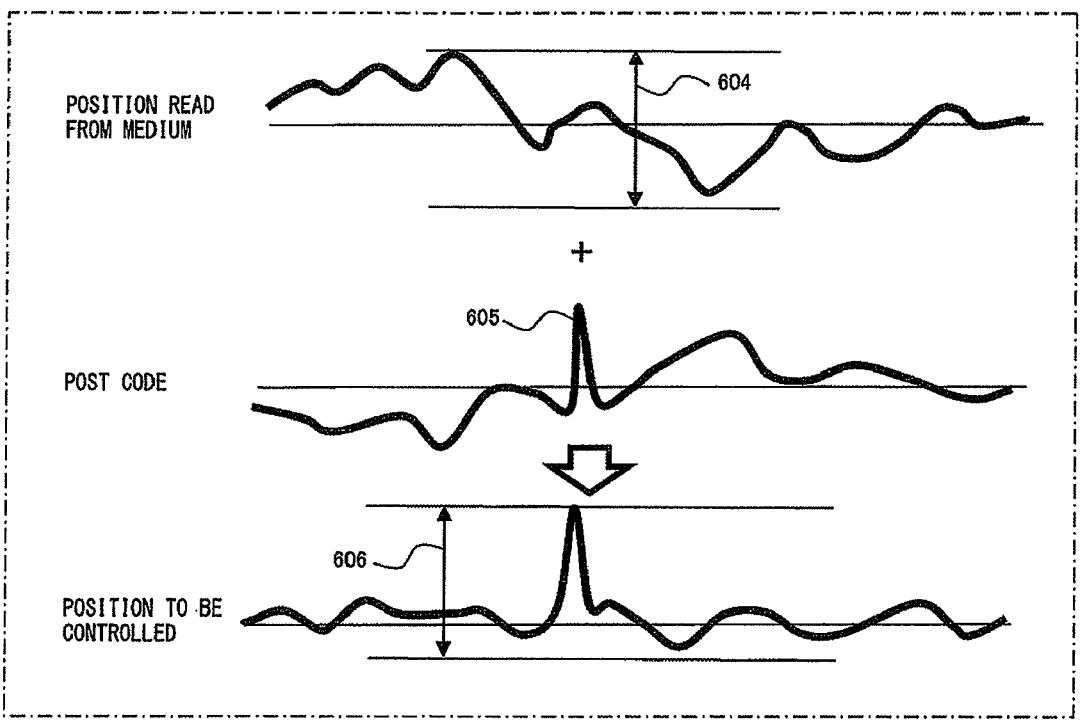
FIG. 12B is a schematic diagram for explaining the operations of the embodiment.

If the on-track condition happens to be satisfied (603) by a combination of a post code and the position of the magnetic head (601) when the post code includes an abnormal value (602) as represented as FIG. 12A, the state where the on-track condition is not satisfied at the time of a subsequent retry can possibly continue (604, 605 and 606 of FIG. 12B). To avoid this, the DSP 108 destroys the value of the post code of the corresponding servo frame, which is stored in the memory, in step S509 if it determines that the on-track condition is not satisfied in the determination made in step S506, and again reads a post code from the medium at the next rotation.

With the configuration according to the embodiment, a post code that is determined to be properly read out is stored for each servo frame of each track and continuously used, whereby a write off track caused by a post code can be avoided.

Additionally, with the configuration according to the embodiment, an unrestorable write off-track error can be avoided by determining whether or not a post code read from a disk recording medium is proper without adding a parity bit, etc. to the post code.

Furthermore, a retry out can be prevented from occurring even if a stored post code is erroneous.

Supplementary Explanation About the Embodiment

In the above described embodiment, when a retry of a data write (a write retry) to the magnetic disk 102 (FIG. 7) occurs, an operation for once clearing post codes corresponding to servo frames, which are stored in the memory, by once doing a seek for another target track may be performed.

As a result, a write retry can be quickly terminated even if the error rate of a post code is high.

Additionally, in the above described embodiment, a control can be performed so that post codes which correspond to servo frames and are stored in the memory are not cleared while the on-track condition is satisfied for a target track even when the seek instruction for a new target track is received.

Furthermore, in the above described embodiment, a control can be also performed so that a post code is stored in the memory only after the seek operation for a data write to the disk recording medium is performed.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A servo controlling method, which is used in a disk storage device, for controlling a head to be positioned on a target track by reading servo information and a post code, which indicates an eccentricity of the servo information, from each servo frame recorded on each track of a disk recording medium via the head provided in an actuator, by correcting a demodulation position demodulated from the servo information with the post code, and by driving the actuator on the basis of the corrected demodulation position, comprising:

storing the post code, which is read from each servo frame on the target track of the disk recording medium, in a memory if an on-track condition for determining that the head is controlled to be positioned on the target track is satisfied; and using the post code stored in the memory in order for a correction of the demodulation position if the post code corresponding to each servo frame is stored in the memory and the on-track condition is satisfied, in the correction of the demodulation position in each servo frame.

2. The servo information correcting method according to claim 1, further comprising:

clearing the post code stored in the memory if the post code corresponding to each servo frame is stored in the memory and the on-track condition is not satisfied, in the correction of the demodulation position in each servo frame.

3. The servo information correcting method according to claim 1, further comprising:

clearing all post codes that correspond to servo frames and are stored in the memory when a seek operation for a new target track starts.

4. The servo information correcting method according to claim 3, further comprising:

once clearing all the post codes that correspond to the servo frames and are stored in the memory by once doing a seek for another target track during a retry of a data write to the disk recording medium.

5. The servo information correcting method according to claim 1, wherein the on-track condition is a condition for determining that the head is controlled to be positioned so that an eccentricity of the head from a center position of the target track is within a predetermined value.

6. The servo information correcting method according to claim 1, wherein the on-track condition is a condition for determining that the state where the head is controlled to be positioned so that an eccentricity of the head from a center position of the target track is within a predetermined value is satisfied for a predetermined number of successive servo frames.

7. The servo information correcting method according to claim 1, wherein the post code that corresponds to each servo frame and is stored in the memory is not cleared while the on-track condition is satisfied for the current target track even when a seek instruction for a new target track is received.

8. The servo information correcting method according to claim 1, wherein the operation of storing the post code in the memory is executed only after a seek operation for a data write to the disk recording medium is performed.

* * * * *